US009367774B2

(12) United States Patent
Kuto (10) Patent No.: US 9,367,774 B2
(45) Date of Patent: Jun. 14, 2016

(54) SETTING STORAGE DEVICE STORING SETTING INFORMATION ASSOCIATED WITH AN ADJUSTMENT INFORMATION

(71) Applicant: FUJI XEROX CO., LTD., Tokyo (JP)

(72) Inventor: Nobuyuki Kuto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/254,443

(22) Filed: Apr. 16, 2014

(65) Prior Publication Data

US 2015/0098108 A1 Apr. 9, 2015

(30) Foreign Application Priority Data

Oct. 9, 2013 (JP) ................................. 2013-211929

(51) Int. Cl.
G06F 3/12 (2006.01)
G06K 15/02 (2006.01)
G06K 15/00 (2006.01)

(52) U.S. Cl.
CPC ........ *G06K 15/1805* (2013.01); *G06K 15/1809* (2013.01); *G06K 15/4025* (2013.01)

(58) Field of Classification Search
None
See application file for complete search history.

(56) References Cited

U.S. PATENT DOCUMENTS

| 2006/0271602 | A1* | 11/2006 | Davis ................ G06F 17/30123 |
| 2010/0149595 | A1* | 6/2010 | Nishida ........................ 358/1.16 |
| 2012/0062961 | A1* | 3/2012 | Yamaai ................. G06F 17/243 |
| | | | 358/448 |
| 2012/0268791 | A1* | 10/2012 | Shibata .............. G06K 15/1806 |
| | | | 358/1.16 |

FOREIGN PATENT DOCUMENTS

| JP | A-2011-97460 | 5/2011 |
| JP | A-2011-116088 | 6/2011 |

* cited by examiner

*Primary Examiner* — Vincent Rudolph
*Assistant Examiner* — Richa Mishra
(74) *Attorney, Agent, or Firm* — Oliff PLC (57) ABSTRACT

A setting storage device, includes: a storage unit which stores setting information and adjustment information to be associated with each other; and a control unit which, in case that, i) first setting information associated with first adjustment information is introduced, ii) second adjustment information has been stored in the storage unit, iii) the second adjustment information has the same name as the first adjustment information associated with the first setting information and iv) the second adjustment information has the same content as the first adjustment information associated with the first setting information, stores the first setting information in the storage unit to be associated with the second adjustment information without storing the first adjustment information.

3 Claims, 8 Drawing Sheets

FIG. 3A BEFORE INTRODUCTION

FIG. 3B AFTER INTRODUCTION

FIG. 4

FIG. 5A  SETTING INFORMATION

| NAME | SIZE | TYPE | COATING | NUMBER OF SHEETS IN ONE SET | PUNCH HOLES | COLOR | POSITION ADJUSTMENT | FOLDING ADJUSTMENT |
|---|---|---|---|---|---|---|---|---|
| K01 | B5 | PLAIN PAPER | NO | NO DESIGNATION | NO | BRIGHT YELLOW | A01 | - |
| K02 | A4 | FILM | NO | NO DESIGNATION | - | TRANSPARENT | - | A02 |
| K03 | A3 | PLAIN PAPER | NO | NO DESIGNATION | NO | BLUE | - | - |
| K04 | POSTCARD | POSTCARD | COATING | NO DESIGNATION | - | GRAY | A04 | - |
| ... | ... | ... | ... | ... | ... | ... | ... | ... |

FIG. 5B  POSITION ADJUSTMENT (A01)

FIG. 5C  FOLDING ADJUSTMENT (A02)

SETTING STORAGE DEVICE STORING SETTING INFORMATION ASSOCIATED WITH AN ADJUSTMENT INFORMATION

CROSS-REFERENCE TO RELATED APPLICATIONS

This application is based on and claims priority under 35 U.S.C. 119 from Japanese Patent Application No. 2013-211929, filed on Oct. 9, 2013.

BACKGROUND

1. Technical Field

The present invention relates to a setting storage device, an image forming apparatus, and a non-transitory computer readable medium.

2. Related Art

Various apparatuses are operated depending on previously introduced setting information and the setting information is typically set at each apparatus. There has been developed a method of transmitting the setting information to other apparatuses to use the setting information. And recently, there has been developed a method of generating the setting information at, for example, an external computer and introducing the setting information into each apparatus. For example, as an image forming apparatus having a function of forming an image on paper, there is an apparatus having a function of introducing setting information in which information on paper to be used is set in advance. In the technology, the setting of setting information is performed at, for example, one apparatus or computer and the setting information is introduced into a plurality of apparatuses, thereby preventing each apparatus from performing redundant settings.

The setting information may be associated with adjustment information of each apparatus.

For example, the setting information of the information on the paper in the image forming apparatus as described above may be associated with adjustment information such as alignment adjustment or folding adjustment. In case that the setting information is associated with the adjustment information as described above, the associated adjustment information may be also introduced when the setting information is introduced into a certain apparatus.

SUMMARY

According to an aspect of the invention, a setting storage device, includes: a storage unit which stores setting information and adjustment information to be associated with each other; and a control unit which, in case that, i) first setting information associated with first adjustment information is introduced, ii) second adjustment information has been stored in the storage unit, iii) the second adjustment information has the same name as the first adjustment information associated with the first setting information and iv) the second adjustment information has the same content as the first adjustment information associated with the first setting information, stores the first setting information in the storage unit to be associated with the second adjustment information without storing the first adjustment information, and in case that, i) the first setting information associated with the first adjustment information is introduced, ii) the second adjustment information has been stored in the storage unit, iii) the second adjustment information has the same name as the first adjustment information associated with the first setting information, and iv) the second adjustment information has a different content from the first adjustment information associated with the first setting information, changes the name of the first adjustment information and stores the first setting information and the first adjustment information in the storage unit to be associated with each other.

BRIEF DESCRIPTION OF THE DRAWINGS

Exemplary embodiment(s) of the present invention will be described in detail based on the following figures, wherein.

DETAILED DESCRIPTION

Figure 1:
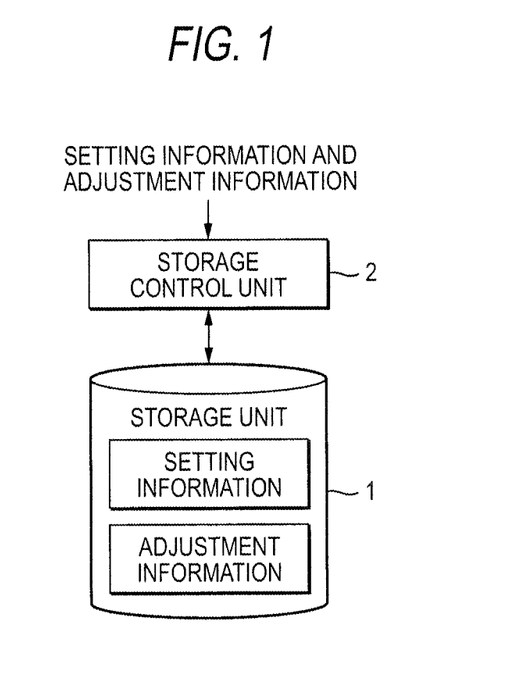
FIG. 1 is a configuration diagram illustrating a setting storage device according to an exemplary embodiment of the present invention.

FIG. 1 is a configuration diagram illustrating a setting storage device according to an exemplary embodiment of the present invention. In FIG. 1, reference numeral 1 is a storage unit and reference numeral 2 is a storage control unit. The storage unit 1 stores, for example, setting information and adjustment information. The setting information may be associated with at least one adjustment information piece.

The storage control unit 2 controls recording and reading-out of information in and from the storage unit 1. When the setting information written by external or other apparatuses is introduced, the adjustment information associated with the setting information is also introduced. In case that adjustment information having the same name as the introduced adjustment information has been stored in the storage unit 1, when the adjustment information having the same name stored in the storage unit 1 has the same content, the introduced setting information is stored in the storage unit 1 to be associated with the adjustment information having been stored in the storage unit 1. Further, when the adjustment information having the same name has different content, the introduced adjustment information associated with the setting information is given a different name, and the adjustment information having the different name is associated with the setting information while the setting information and the adjustment information having the different name are stored in the storage unit 1. Further, when the introduced adjustment information is stored in the storage unit 1, the content of the adjustment information may be modified in accordance with a previously acquired adjustment value unique to the apparatus. Further, the setting storage device may have a function of collectively introducing a plurality of setting information pieces. Further, the setting storage device may have a function of reading out the setting information and the adjustment information, which are stored in the storage unit 1, and transmitting the read setting information and adjustment information to the external or other apparatuses.

The storage unit 1 and the storage control unit 2 may coexist in a certain apparatus or may be disposed in separate apparatuses to be connected to each other via, for example, a communication channel.

Figure 2:
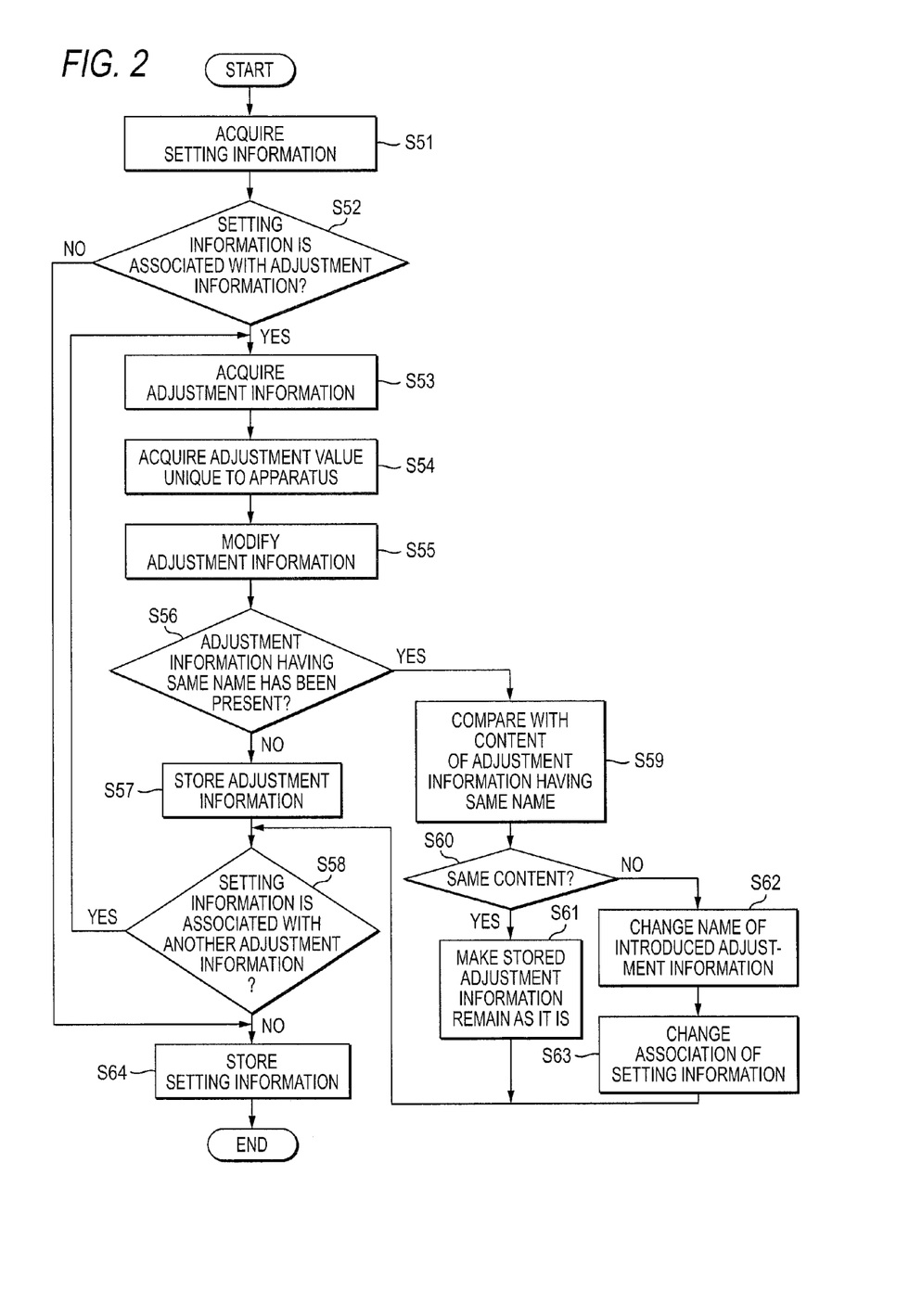
FIG. 2 is a flow chart illustrating an example of an operation of the setting storage device according to the exemplary embodiment.

FIG. 2 is a flow chart illustrating an example of an operation of the setting storage device according to the exemplary embodiment of the present invention. An example of an operation of the case in which one setting information piece is introduced will be described herein.

In step S51, the introduced setting information is acquired. In step S52, it is determined whether the acquired setting information is associated with any adjustment information. When the associated adjustment information is not present, in step S64, the setting information is stored in the storage unit 1 and the introduction processing of the setting information ends.

In step S52, if it is determined that the setting information is association with the adjustment information, in step S53, the associated adjustment information is specified and acquired. In the operation example, the acquired adjustment information is modified depending on the introduction side apparatus. In step S54, a unique adjustment value which has been acquired in advance for the apparatus into which the adjustment information is introduced is acquired and in step S55, the content of the adjustment information are recalculated and modified depending on the adjustment value. Due to the modification, there is no need to perform the adjustment according to the apparatus again. Further, at the time of comparing the contents as described below, a comparison of the adjustment information set according to the apparatus is performed. Further, when the information relying on the apparatus is not present in the adjustment information, the processing of S54 and S55 are not required.

In step S56, it is determined whether adjustment information having the same name as the introduced adjustment information has been stored in the storage unit 1. If the adjustment information having the same name has not been stored in the storage unit 1, in step S57, the introduced adjustment information is stored in the storage unit 1.

In step S56, if it is determined that the adjustment information having the same name as the introduced adjustment information has been stored in the storage unit 1, in step S59, the content of the introduced adjustment information are compared with the content of the adjustment information having the same name as the adjustment information. In step S60, it is determined whether the content of the introduced adjustment information and the content of the adjustment information having the same name as the adjustment information are the same as each other. If so, in step S61, the adjustment information having the same name remains as it is without storing the new adjustment information in the storage unit 1. In this case, the name in the setting information which is to be associated with the adjustment information is not changed, and thus the setting information is associated with the adjustment information having the same name which has been already stored in the storage unit 1. When the association is not determined using a name, the information in the setting information which is associated with the adjustment information may be changed to be associated with the adjustment information having the same name and the same content which is stored in the storage unit 1.

In step S60, if it is determined that the content of the introduced adjustment information is different from the content of the adjustment information having the same name as the adjustment information, in step S62, the name of the introduced adjustment information is changed and stored in the storage unit 1. Further, in step S63, the name in the introduced setting information which is associated with the adjustment information is changed to the changed name. When the association is not determined using the name, the information of the setting information which is associated with the adjustment information may be changed to be associated with the adjustment information which is introduced with the changed name.

After the processing of S57, S61, and S63, in step S58, it is determined whether the setting information is association with another adjustment information piece has been processed. In addition, it is determined whether the setting information is associated with non-processed adjustment information. In case that the association with the non-processed adjustment information remains, the process returns to S53, the non-processed adjustment information is acquired, and then the processing on the adjustment information is performed. In case that the association with the non-processed adjustment information does not remain, in step S64, the setting information is stored in the storage unit 1 and the introduction of the setting information ends.

When the setting information is stored in step S64, the adjustment information may be rewritten in step S63. That is, when the setting information is introduced, in case that the setting information is associated with the adjustment information and the adjustment information having the same name as the adjustment information but different content from the adjustment information has been previously stored in the storage unit 1, the name of the originally associated adjustment information is changed and stored in the storage unit 1, and the adjustment information having the changed name and the setting information are stored in the storage unit 1 so that they are associated with each other. Therefore, when the setting information is introduced, the setting information is not associated with the adjustment information having different content and a mismatch of the setting is prevented.

When the setting information is introduced, in case that the setting information is associated with the adjustment information and the adjustment information having the same name and content as the adjustment information has been already stored in the storage unit 1, the adjustment information, which has been already stored in the storage unit 1, is used as it is without introducing the adjustment information. Therefore, a plurality of adjustment information pieces having the same contents is not stored in the storage unit 1.

When a plurality of setting information pieces is introduced, the above-mentioned processing may be performed on each setting information piece.

Figure 3A:
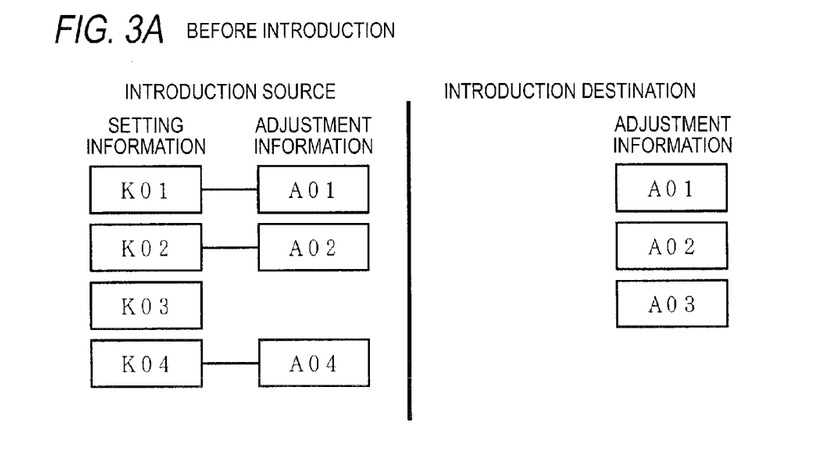
FIGS. 3A and 3B are conceptual diagrams illustrating one detailed example of the introduction of setting information of the setting storage device according to the exemplary embodiment.
Figure 3B:
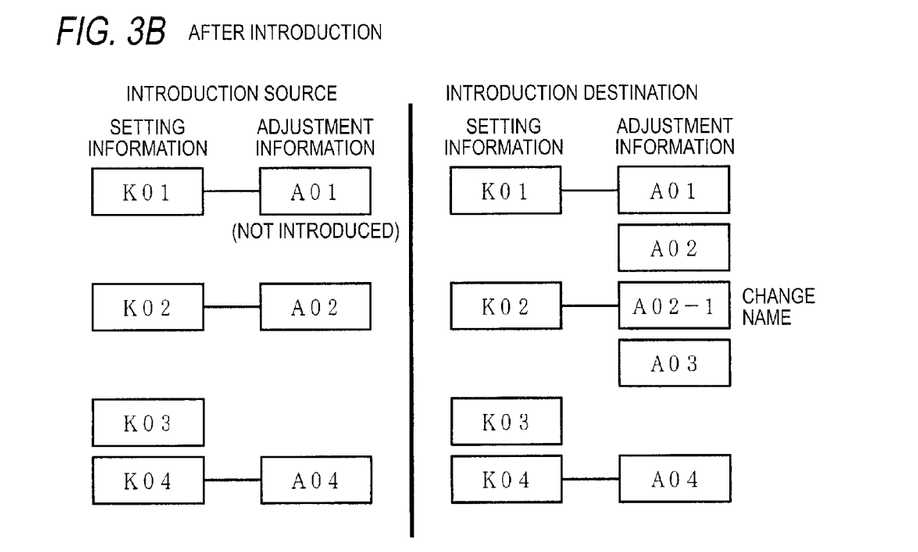

FIGS. 3A and 3B are conceptual diagrams illustrating one detailed example of the introduction of setting information of the setting storage device according to the exemplary embodiment of the present invention. FIG. 3A illustrates each information piece before being introduced. In the detailed example, as the setting information, four setting information pieces of 'K01', 'K02', 'K03', and 'K04' are illustrated, in which the 'K01' is associated with adjustment information having a name of 'A01', the 'K02' is associated with adjustment information having a name of 'A02', and the 'K04' is associated with adjustment information having a name of 'A04'. Meanwhile, the adjustment information pieces having the names of 'A01', 'A02', and 'A03' have been stored in the storage unit 1. In this state, the setting information pieces are introduced.

The state after the setting information is introduced is illustrated in FIG. 3B. First, the case in which the setting information 'K01' is introduced will be described. The setting information 'K01' is associated with the adjustment information 'A01'. If it is determined whether the adjustment information having the same name as the adjustment information 'A01' has been in the storage unit 1, in this example, the adjustment information having the same name is present. In this case, the contents are further compared. Herein, it is assumed that the adjustment information 'A01' to be introduced and the adjustment information 'A01' stored in the storage unit 1 have the same contents. Then, the adjustment information 'A01' stored in the storage unit 1 is used as it is and the adjustment information 'A01' intended to be introduced, which is associated with the original setting information, is not introduced. Further, the setting information 'K01' is associated with the adjustment information 'A01', which is originally stored in the storage unit 1, by storing the setting information 'K01' in the storage unit 1. In this case, the increase in adjustment information does not occur. Further, the setting information is associated with the adjustment information having the same content and, for example, the mismatch of the setting does not occur.

Next, the case in which the setting information 'K02' is introduced will be described. The setting information 'K02' is associated with the adjustment information 'A02'. If it is determined whether the adjustment information having the same name as the adjustment information 'A02' has been present in the storage unit 1, in this example, the adjustment information having the same name is present. In this case, the contents are further compared. Herein, it is assumed that the adjustment information 'A02' to be introduced and the adjustment information 'A02' stored in the storage unit 1 have different contents. If the contents are different from each other, the adjustment information is stored with a changed name in the storage unit 1, and the association of the setting information with the adjustment information is changed to be associated with the adjustment information having the changed name. In this example, the name of the adjustment information is changed to 'A02-1' and then the adjustment information with the changed name is stored in the storage unit 1, and the setting information is changed to be associated with the adjustment information having the changed name 'A02-1' and then stored in the storage unit 1. Therefore, the setting information is associated with the adjustment information having different content, and the mismatch of the setting does not occur.

As to the setting information 'K03', the setting information is not associated with any adjustment information and is stored in the storage unit 1 as it is. Further, the setting information 'K04' is associated with the adjustment information 'A04'. However, since adjustment information having the same name as the adjustment information 'A04' has not been present in the storage unit 1, the setting information 'K04' and the adjustment information 'A04' are stored in the storage unit 1 as they are.

In this way, when the setting information is introduced, the associated adjustment information is also introduced. Therefore, there is no need to write the setting information or the adjustment information again. When the adjustment information is introduced, if the adjustment information having the same name and the same content has been already present in the storage unit 1, the existing adjustment information is used, and thus the increase in adjustment information is further suppressed as compared with the case in which the adjustment information is introduced as it is. Further, in connection with the association of the setting information with the adjustment information, the mismatch of the setting does not occur.

Even though the modification of the adjustment information relying on the apparatus is not described herein, the adjustment information may be modified before being stored in the storage unit 1.

Figure 4:
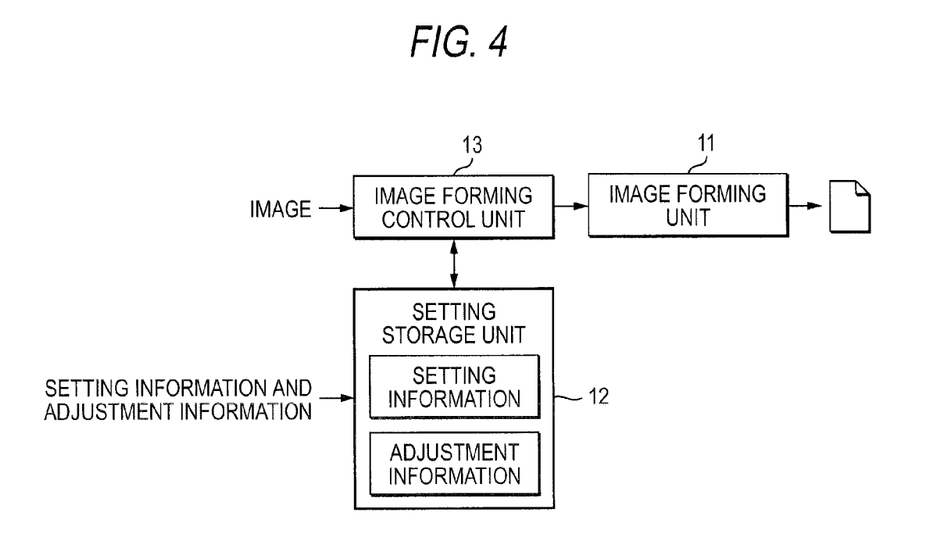
FIG. 4 is a configuration diagram illustrating an image forming apparatus according to the exemplary embodiment.

FIG. 4 is a configuration diagram illustrating an image forming apparatus according to an exemplary embodiment of the present invention. In FIG. 4, reference numeral 11 is an image forming unit, reference numeral 12 is a setting storage unit, and reference numeral 13 is a forming control unit. The image forming unit 11 forms an image on a medium such as paper according to the control by the forming control unit 13.

The setting storage unit 12 includes the above described configuration of the setting storage device according to the exemplary embodiment, for example, at least the storage unit 1 and stores, for example, the setting information, and the adjustment information. As described above, there is a case in which the setting information is associated with at least one adjustment information piece.

The forming control unit 13 operates the image forming unit 11 according to the setting information and the adjustment information which are stored in the setting storage unit 12. Further, the forming control unit 13 may be configured to include the above described function of the storage control unit 2 of the setting storage device according to the exemplary embodiment of the present invention.

Figure 5A:
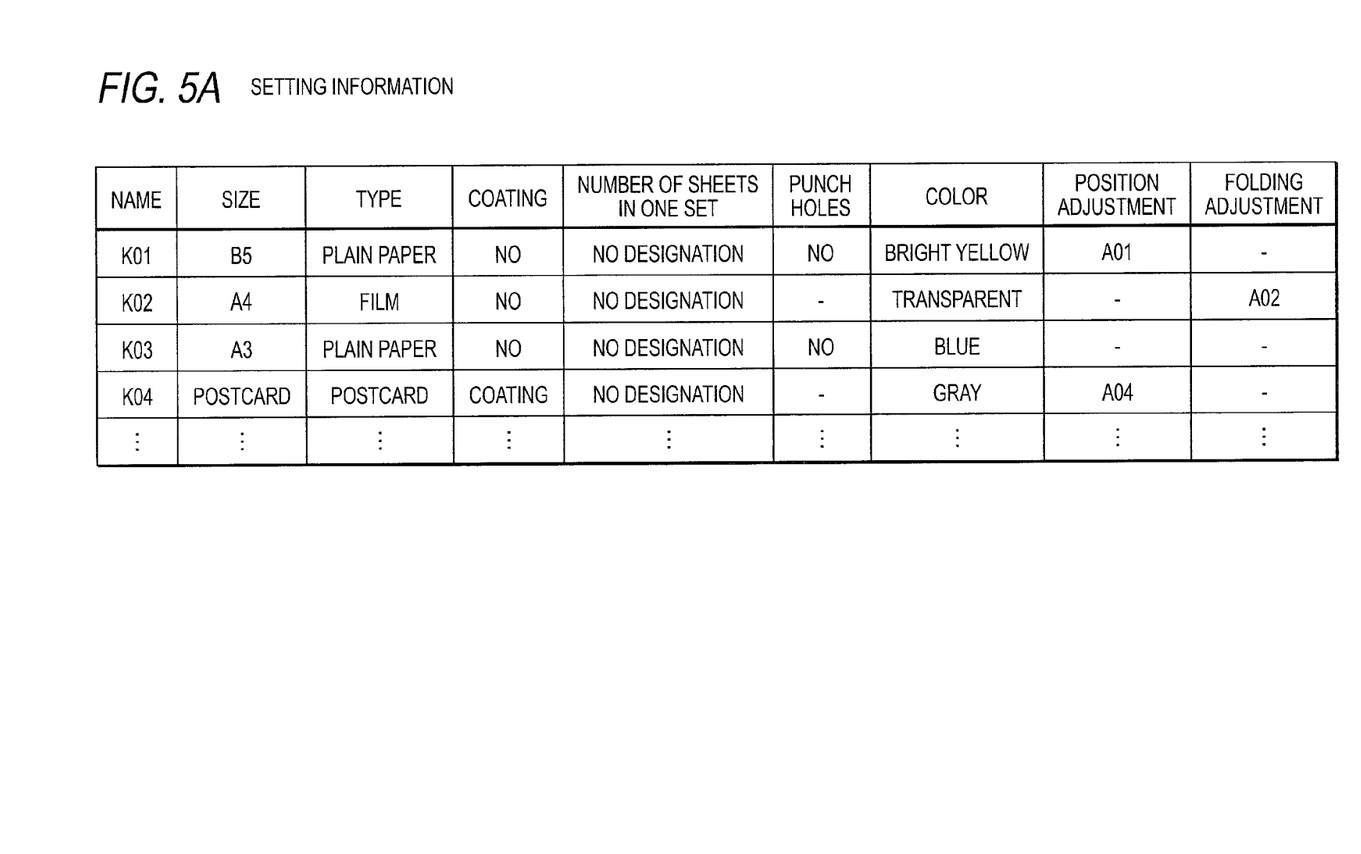
FIGS. 5A to 5C are explanatory views of an example of setting information and adjustment information of the image forming apparatus according to the exemplary embodiment.
Figure 5B:
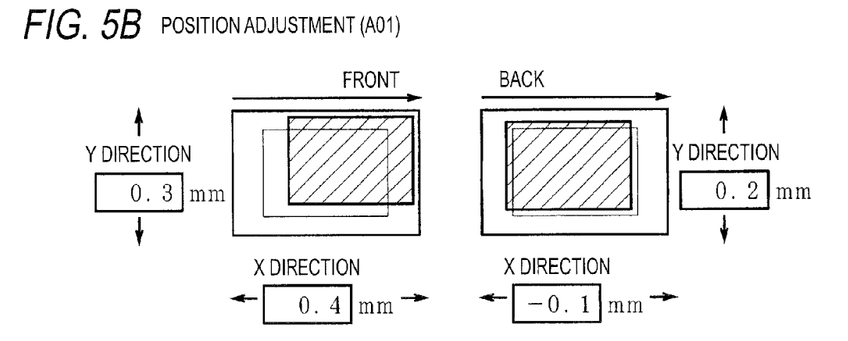
Figure 5C:
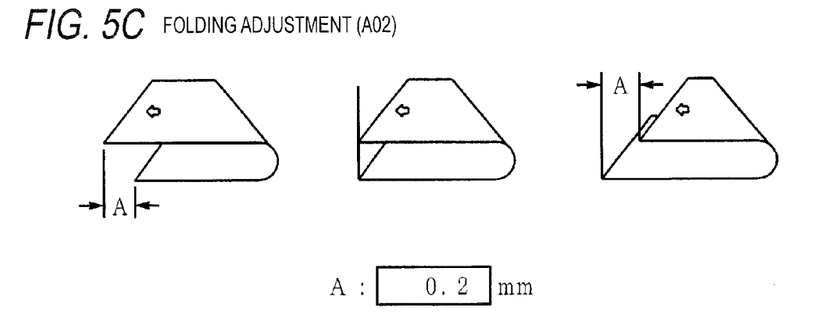

FIGS. 5A to 5C are explanatory views of an example of setting information and adjustment information of the image forming apparatus according to the exemplary embodiment of the present invention. FIG. 5A illustrates an example of the setting information. The setting information is information on paper to be used, and in this example, indicates each setting item such as a size, a paper type, presence or absence of coating, the number of sheets in one set, presence and absence of punch holes, a color of paper, position adjustment, and folding adjustment. Further, various setting items may be present in addition to the above setting items, and some of setting items may not be used as the setting items.

Among these setting items, in this example, there is a case in which the position adjustment and the folding adjustment refer to the adjustment information. For example, the setting information having the name of 'K01' indicates that the setting item of the position adjustment refers to the adjustment information 'A01'. Further, the setting information having the name of 'K02' indicates that the setting item of the folding adjustment refers to the adjustment information 'A02'.

FIG. 5B schematically illustrates an example of the information included in the adjustment information when the adjustment information includes, for example, information for adjusting a position at which an image is formed. In this example, a shifted amount of a position at which each image is formed with respect to two directions of an X direction and a Y direction is set on a front surface and a back surface of paper. The set value is stored in the setting storage unit 12 as the adjustment information of the image forming position. In addition to a deviation amount, for example, the set value may include various information pieces such as magnification, squareness or inclined degree of each direction.

The adjustment information of the image forming position is associated with the setting information as described in FIG. 5A. In this example, it is assumed that the adjustment information is stored in the setting storage unit 12 as the 'A01' and associated with the setting information 'K01'.

FIG. 5C schematically illustrates an example of the information included in the adjustment information when the adjustment information includes, for example, information on folding adjustment. In this example, when paper is folded, a deviation amount A of an edge of the paper is set. The set value is stored in the setting storage unit 12 as the setting information which adjusts the folded position. Further, the adjustment information is associated with the setting information as described in FIG. 5A. In this example, it is assumed that the adjustment information is stored in the setting storage unit 12 as the 'A02' and associated with the setting information 'K02'.

The setting information and the adjustment information are written by a certain image forming apparatus and introduced into a separate image forming apparatus or are written by the separate image forming apparatus and introduced into each image forming apparatus. In this case, the setting storage unit 12 is operated by the above described operation of the setting storage device according to the exemplary embodiment of the present invention, for example, depending on the example of the operation illustrated in FIG. 2 so that the setting information and the adjustment information may be introduced and stored in the setting storage unit 12.

In connection with the detailed example in which the setting information and the adjustment information are introduced, the detailed example illustrated in FIGS. 5A to 5C will be described with reference to FIGS. 3A and 3B. When the setting information 'K01' is introduced, the adjustment information 'A01' is also introduced. However, when the adjustment information 'A01' is already present at an introduction destination at that time, the content of the adjustment information to be introduced are compared with the content of the already present adjustment information. If the content of the adjustment information to be introduced and the content of the already present adjustment information are the same as each other, the already present adjustment information is used. Then, the adjustment information 'A01' is not introduced again and the setting information 'K01' is stored in the setting storage unit 12 to be associated with the already present adjustment information 'A01'.

For example, when the setting information 'K02' is introduced, the adjustment information 'A02' is also introduced. However, when the adjustment information 'A02' is already present at the introduction destination at that time, the content of the adjustment information to be introduced are compared with the content of the already present adjustment information. If the content of the adjustment information to be introduced and the content of the already present adjustment information are different from each other, the name of the adjustment information to be introduced is changed into, for example, 'A02-1', and the adjustment information with the changed name is stored in the setting storage unit 12. Then, the setting information 'K02' is stored in the setting storage unit 12 to be associated with the adjustment information 'A02-1' having the changed name.

In this way, when the setting information is introduced, if there is the associated adjustment information, the adjustment information is also introduced. In this case, when the adjustment information having the same name and the same content is already present in the storage unit 1, the adjustment information is used, and thus the increase in adjustment information is suppressed. Further, even in connection with the association of the setting information with the adjustment information, the mismatch of the setting does not occur. Further, when a plurality of setting information pieces is collectively introduced, the above-mentioned processing is performed on each setting information piece.

Figure 6:
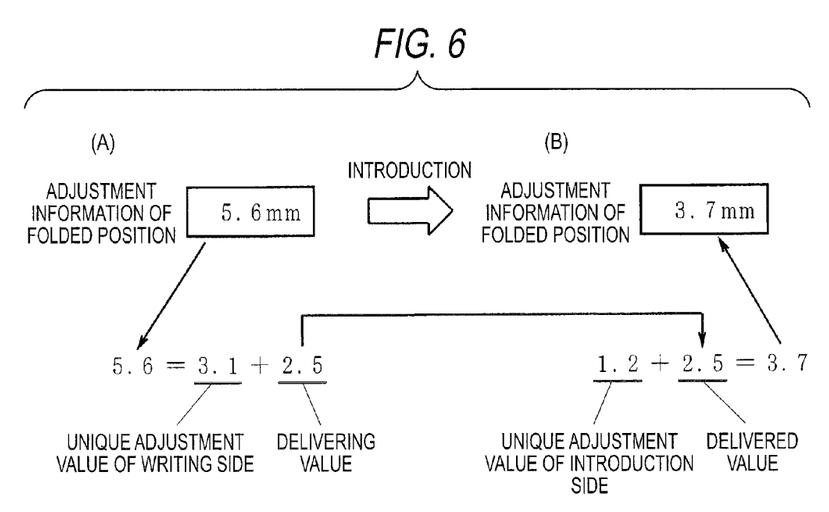
FIG. 6 is an explanatory diagram illustrating one detailed example of the modification of adjustment information of the setting storage device according to the exemplary embodiment.

FIG. 6 is an explanatory diagram illustrating one detailed example of the modification of adjustment information of the setting storage device according to the exemplary embodiment of the present invention. The modification processing performed on the adjustment information at the time of introduction will be described with reference to the detailed example. For example, it is assumed that the adjustment information written by a certain image forming apparatus is introduced into a separate image forming apparatus.

In part (a) of FIG. 6, the detailed example of the written adjustment information of the folded position is illustrated. In this example, it is assumed that when two sheets of paper are folded, the folded position is set to be shifted by 5.6 mm. In the image forming apparatus in which the adjustment information is written, a unique adjustment value of the folded position is present in the image forming apparatus. The adjustment information of the folded position includes the unique adjustment value. When the unique adjustment value is set to be 3.1 mm, 2.5 mm obtained by subtracting the unique adjustment value is delivered to another image forming apparatus as the adjustment information of the folding adjustment based on equation 3.1+2.5=5.6 when the adjustment information of the folded position is introduced into another image forming apparatus.

In part (b) of FIG. 6, the modification processing when the adjustment information of the folded position is introduced is illustrated. As described above, a value of the adjustment information of the folded position after modification is obtained from the delivered adjustment information of the folded position and the unique adjustment value of the introduction side image forming apparatus. For example, when the unique adjustment value of the introduction side image forming apparatus is 1.2 mm, the delivered adjustment information of the folding adjustment, 2.5 mm, is added thereto. Based on equation 1.2+2.5=3.7, the adjustment information of the folded position after modification is set as 3.7 mm, and is stored in the setting storage unit 12.

The adjustment information is modified by the unique adjustment value of the apparatus as described above, and thus even though the adjustment information is introduced into any of the image forming apparatuses, the occurrence of mismatch is prevented. The adjustment information of the folded position is illustrated herein, but for example, at the time of introduction, the adjustment information of the image forming position illustrated in FIG. 5B may also be modified depending on the unique adjustment value of the apparatus. Further, when unique adjustment values of the apparatus are present in relation to other adjustment information pieces, the adjustment information may also be modified depending on the unique adjustment values of the apparatus.

As described above, the adjustment information is modified depending on the introduction side apparatus, and therefore no change occurs in each apparatus. Further, there is no need to write different adjustment information pieces in each apparatus.

In the above-mentioned detailed example, the case in which the information on the paper to be used is introduced as the setting information is described by way of example. However, the present invention is not limited thereto, and variously set information may be used as the setting information and any associated information may be associated as the adjustment information.

The example in which the setting storage device according to the exemplary embodiment of the present invention is applied to the image forming apparatus is illustrated herein, but the setting storage device may be applied to various apparatuses of which settings may be performed even in other apparatuses. For example, in the case of an image reading apparatus, various reading conditions are used as the setting information and the associated information is associated as the adjustment information, and the setting storage device according to the exemplary embodiment of the present invention may be applied to the case in which the setting information written by another apparatus is introduced.

Figure 7:
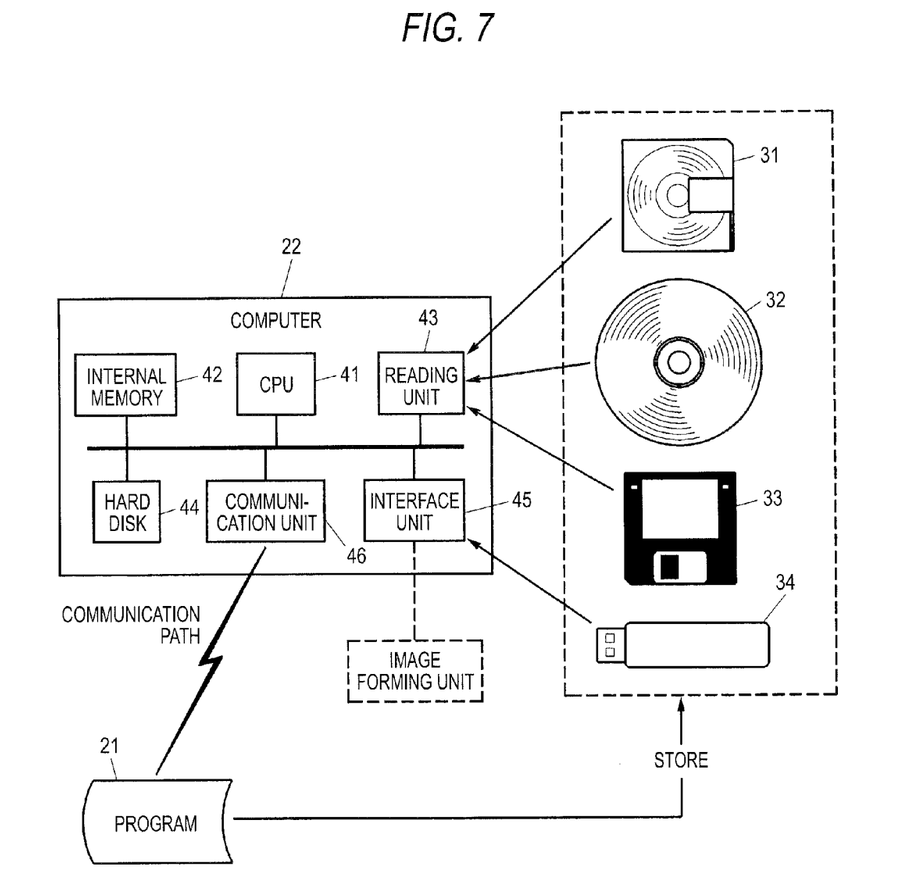
FIG. 7 is an explanatory diagram of one example of a computer program, a storage medium in which the computer program is stored, and a computer, in case that a function of a storage control unit described in the setting storage device according to the exemplary embodiment is realized by the computer program.

FIG. 7 is an explanatory diagram of one example of a computer program, a storage medium in which the computer program is stored, and a computer, in case that a function of the storage control unit described in the setting storage device according to the exemplary embodiment of the present invention is realized by the computer program. In FIG. 7, reference numeral 21 is a program, reference numeral 22 is a computer, reference numeral 31 is a magneto-optical disk, reference numeral 32 is an optical disc, reference numeral 33 is a magnetic disc, reference numeral 34 is a memory, reference numeral 41 is a CPU, reference numeral 42 is an internal memory, reference numeral 43 is a reading unit, reference numeral 44 is a hard disc, reference numeral 45 is an interface unit, and reference numeral 46 is a communication unit.

All or a part of the above described functions of the storage control unit 2 in the setting storage device according to the exemplary embodiment of the present invention may be realized by the program 21 which is executed by the computer. In this case, for example, the program 21 and data used by the program may be stored in a computer-readable storage medium. The storage medium causes a change of an energy state, such as magnetism, light, and electricity, with respect to the reading unit 43 provided in a hardware resource of the computer, depending on a description content of the program, and transfers the description content of the program to the reading unit 43 in a signal type corresponding thereto. For example, as the storage medium, there are the magneto-optical disc 31, the optical disc 32 (including, for example, a CD or a DVD), the magnetic disc 33, and the memory 34 (including, for example, an IC card, a memory card, or a flash memory). Further, these storage media are not limited to a portable type.

The program 21 is stored in these storage media and these storage media are mounted in, for example, the reading unit 43 or the interface unit 45 of the computer 22 so as to read out the program 21 from the computer. Then, the program 21 is stored in the internal memory 42 or the hard disk 44 (including, for example, a magnetic disc, or a silicon disc) to be executed by the CPU 41, and all or a part of the above described functions of the storage control unit 2 in the setting storage device according to the exemplary embodiment of the present invention is realized. Alternatively, the program 21 may be transmitted to the computer 22 through a communication channel, and in the computer 22, the program 21 may be received by the communication unit 46 and thus may be stored in the internal memory 42 or the hard disk 44 so that the program 21 may be executed and realized by the CPU 41.

The above described storage unit 1 in the setting storage device according to the exemplary embodiment of the present invention may be constituted by, for example, the hard disc 44 or the internal memory 42.

In addition to these, the computer 22 may be connected to various apparatuses through the interface unit 45. For example, the computer 22 is connected to the image forming unit 11 which forms an image on paper, and the function of the image forming apparatus according to the exemplary embodiment of the present invention may be realized by the computer 22, being integrated with the program realizing the function of the forming control unit 13. Further, other apparatuses may be connected to the interface unit 45. Further, each processing needs not be operated in one computer and the processing may be executed by a separate computer depending on the processing step.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a tangible medium;
   a storage unit which stores setting information and adjustment information to be associated with each other; and
   a processor to function as:
      a forming control unit, and
      a storage control unit,
   wherein the forming control unit operates the image forming unit depending on the setting information and the adjustment information stored in the storage unit, and
   the storage control unit, in case that,
   i) first setting information associated with first adjustment information is introduced,
   ii) second adjustment information has been stored in the storage unit without any setting information,
   iii) the second adjustment information has a same name as the first adjustment information associated with the first setting information, and
   iv) the second adjustment information has a same content as the first adjustment information associated with the first setting information,
   stores the first setting information in the storage unit to be associated with the second adjustment information without storing the first adjustment information, and
   in case that,
   i) the first setting information associated with the first adjustment information is introduced,
   ii) the second adjustment information has been stored in the storage unit without any setting information,
   iii) the second adjustment information has the same name as the first adjustment information associated with the first setting information, and
   iv) the second adjustment information has a different content from the first adjustment information associated with the first setting information,
   changes the name of the first adjustment information and stores, in addition to the second adjustment information, the first setting information and the first adjustment information with the changed name in the storage unit to be associated with each other without changing a state of the second adjustment information stored in the storage unit.

2. The image forming apparatus of claim 1, wherein
   the storage control unit, in case of introducing the first setting information associated with first adjustment information, modifies the first adjustment information in accordance with a previously acquired adjustment value.

3. A non-transitory computer readable medium storing a program causing a computer to execute a process for controlling an image forming apparatus comprising an image forming unit that forms an image on a tangible medium and a storage unit which stores setting information and adjustment information to be associated with each other, the process comprising:

operating the image forming unit depending on the setting information and the adjustment information stored in the storage unit; and in case that, i) first setting information associated with first adjustment information is introduced, ii) second adjustment information has been stored in the storage unit without any setting information, iii) the second adjustment information has a same name as the first adjustment information associated with the first setting information, and iv) the second adjustment information has a same content as the first adjustment information associated with the first setting information, storing the first setting information in the storage unit to be associated with the second adjustment information without storing the first adjustment information, and in case that, i) the first setting information associated with the first adjustment information is introduced, ii) the second adjustment information has been stored in the storage unit without any setting information, iii) the second adjustment information has the same name as the first adjustment information associated with the first setting information, and iv) the second adjustment information has a different content from the first adjustment information associated with the first setting information, changing the name of the first adjustment information and storing, in addition to the second adjustment information, the first setting information and the first adjustment information with the changed name in the storage unit to be associated with each other without changing a state of the second adjustment information stored in the storage unit.

* * * * *